United States Patent Office 2,814,600
Patented Nov. 26, 1957

2,814,600

CELLULAR RESINS FROM ARYLENE DIISOCYANATES AND POLYSULFIDE POLYMERS AND METHOD OF MAKING SAME

Andrew Mitchell 3rd, La Canada, Calif., assignor to E. I. du Pont de Nemours and Company, Wilmington, Del., a corporation of Delaware No Drawing. Application January 19, 1954,
Serial No. 405,036

7 Claims. (Cl. 260—2.5)

This invention relates to cellular rubber-like materials and more particularly to cellular materials resulting from the reaction of water with polythiourethane products formed from arylene diisocyanates and liquid polysulfide polymers.

Sponge rubber is ordinarily made by incorporating a blowing agent into a very soft rubber stock so that during the heating which occurs in the vulcanization step, gas is evolved to expand the rubber into a spongy mass. Typical blowing agents are ammonium carbonate and a mixture of stearic acid and sodium bicarbonate. Sponge or cellular rubber is also made by beating air into a rubber latex to which has been added a frothing agent such as castor oil soap. The treated latex may contain a delayed action coagulent which coagulates the foam mass after it has been poured into molds and is heated by immersion in hot water. The foamed product may then be removed and dried with warm air and is ready for use. Such processes involve a number of steps and are quite time-consuming. Furthermore, it is difficult to introduce sponge rubber into irregularly shaped spaces.

It is known to prepare foamed plastic materials by the reaction of a diisocyanate and an alkyd resin containing free carboxyl or hydroxyl groups and a small amount of water. Such products are generally quite rigid and are not suitable in most cases as substitutes for sponge rubber.

It is an object of this invention to provide flexible, resilient cellular products which are easily made and which are useful wherever sponge rubber is of value. A further object is to provide a synthetic sponge material which can be readily formed without the application of heat in the place where it is to be used, and need not be premolded or prepared under special reaction conditions.

These and other objects are accomplished by the cellular rubber-like materials of this invention which comprise the reaction product of water with a fluid polythiourethane product formed by the reaction of an arylene diisocyanate and a liquid polysulfide polymer having terminal sulfhydryl groups and having a molecular weight of from about 1000 to about 4000. The proportions of these reactants are such that the ratio of sulfhydryl groups present in the polysulfide polymer to the isocyanate groups present in the arylene diisocyanate is from 0.1:2 to 0.4:2 and the amount of water used is from about one to about two times the amount equivalent to the unreacted isocyanate groups present in the said polythiourethane product.

The process of manufacture of the flexible foams of this invention is quite simple. The arylene diisocyanate and the liquid polysulfide polymer are first reacted together to form a stable liquid condensation product. This polythiourethane condensation product is made by heating the two reactants together in suitable proportions until reaction is complete. Heating at 100° C. for about one hour accomplishes this objective, although other temperatures and reaction times are also satisfactory. The resulting fluid polythiourethane product is cooled and may be stored until the foam is to be prepared. The viscosity of this intermediate product is ordinarily from about 750 to 75,000 centipoises at 30° C. At these viscosities the carbon dioxide which is evolved during foam formation does not escape from the mass to any extent, and still the product is capable of being properly blown into a cellular mass. If the viscosity of the polythiourethane product is too low, the carbon dioxide merely bubbles out and escapes, while if the viscosity is too high, satisfactory mixing cannot be obtained and non-uniform cellular products of higher density result.

The intermediate polythiourethane product is converted to the ultimate cellular rubber-like material simply by mixing it with water, ordinarily in the presence of a tertiary amine catalyst. The reaction mass immediately begins to foam due to the reaction of the unreacted isocyanate groups in the polythiourethane product with the water to form carbon dioxide and substituted ureas. The mixture expands to from five to fifty times its original volume and if in a confined space, the foam will fill up the space in a few minutes and within a relatively short time will cure at room temperature to yield a flexible, low density cellular material which closely resembles foamed rubber.

Any of a wide variety of arylene diisocyanates may be employed in the reaction, including such representative compounds as 2,4-tolylene diisocyanate, m-phenylene diisocyanate, 4-chloro-1,3-phenylene diisocyanate, 4,4'-biphenylene diisocyanate and 1,5-naphthylene diisocyanate. The term "arylene diisocyanate" is intended to refer to those compounds in which each of the two isocyanate groups is attached directly to an aromatic ring. It is not necessary that both isocyanate groups be attached to the same aromatic ring.

The liquid polysulfide polymers which are useful in the practice of this invention are predominantly linear products having terminal —SH groups and a plurality of intralinear polysulfide linkages connecting recurring alkylene or oxyalkylene units. Products of this sort are manufactured commercially by the Thiokol Corporation and are known as "Thiokol" liquid polymers. Such liquid polymers are available in a variety of molecular weights, viscosities and degrees of cross-linking. A suitable product, for example, known as "Thiokol" LP-2, is made by reacting sodium polysulfide with a mixture containing 98% of di(chloroethyl)formal and 2% of 1,2,3-trichloropropane to form a polymer of fairly high molecular weight, and then reducing this polymer to split some of the polysulfide linkages and convert them to sulfhydryl groups. The products useful in the present invention are those having molecular weights from about 1000 to about 4000. These products may be entirely linear or may be branched or cross-linked to some extent.

The arylene diisocyanate and the liquid polysulfide polymer should be employed in such amounts that the ratio of the total number of sulfhydryl groups in the liquid polymer to the number of isocyanate groups in the arylene diisocyanate is from about 0.1:2 to 0.4:2. When this ratio is below 0.1:2, the resulting polythiourethane product is of very low viscosity and when reacted with water is unable to trap the carbon dioxide which is generated. This in turn results in collapse of the foam and the formation of an unsatisfactory product. When the ratio of sulfhydryl groups to isocyanate groups is above 0.4:2, the intermediate polythiourethane product obtained is too viscous to be handled easily. Water cannot be uniformly dispersed throughout the mass before curing begins. As a result, if a foam is obtained at all, it is of poor quality and has an uneven cell size distribution.

In foaming the intermediate polythiourethane product, enough water should be used to react with all the unreacted isocyanate groups present in the intermediate polymer, but there should not be a large excess. If too much water is used, the excess remains in the foam and acts as a plasticizer. If too little water is used, the unreacted isocyanate groups will tend to give instability and to produce excessive cross-linking and will result in less flexible foams. The amount of water used should be from about one to about two times the amount equivalent to the free or unreacted isocyanate groups present in the intermediate polythiourethane product. This will ordinarily correspond to about 0.8 to 2.0 moles per mole of arylene diisocyanate used in preparing the intermediate polymer.

A tertiary amine catalyst is preferably added with the water to form the cellular product. This catalyst may be omitted if longer reaction times or elevated temperatures are used. The tertiary amine catalyst is preferably of low volatility to avoid loss by evaporation and objectionable odor. Suitable compounds include triethylamine, diethylcyclohexylamine, dimethylhexadecylamine, dimethylacetylamine, triethanolamine, pyridine, quinoline and the like. The amount of catalyst may range from none at all to several times by weight the amount of water used.

Instead of using only one each of the arylene diisocyanate and the liquid polysulfide polymer, mixtures of two or more products of either type may be used. Additives such as fillers, extenders, modifiers, etc. may also be incorporated into the material to give various properties to the sponge structure. Generally speaking addition of these materials gives denser, less flexible foamed products.

The products of this invention and the process of making them are illustrated by the following examples, in which parts given are by weight.

Example 1

To a glass flask fitted with an agitator are added 162.4 parts of "Thiokol" LP-2, a liquid polysulfide polymer having a molecular weight of about 4000, having terminal sulfhydryl groups, and being cross-linked to the extent of 2%, i. e., on the average, 2% of the recurring units linked together by sulfide linkages contains either cross-linkages or sulfhydryl groups capable of forming cross-linkages. To this liquid polysulfide polymer are then added 37.6 parts of 2,4-tolylene diisocyanate and the mixture is heated to 100° C. Heating is continued at this temperature for an hour and the mixture is allowed to cool to room temperature, giving a rather viscous liquid polythiourethane product.

To 50 parts of the polythiourethane product is added a mixture of 0.79 part of water and 0.5 part of diethylcyclohexylamine. The ingredients are mixed quickly and thoroughly and allowed to stand. Foaming begins at once. Within about two minutes the mass has foamed to its maximum volume and in an hour has set completely. The result is a flexible foam having good cell structure and resilience and having the general appearance of sponge rubber. Its density is 5.74 lbs. per cubic foot.

Example 2

Using the procedure described in Example 1, foams are prepared using different "Thiokol" liquid polysulfide polymers and varying the proportions of the ingredients, as follows:

|   | "Thiokol" liquid polymer | | | Ratio of sulfhydryl to isocyanate groups | Water, percent of theory used |
|---|---|---|---|---|---|
|   | Type | Mol. wt. | Percent cross linking | | |
| A | LP-2 | 4,000 | 2 | 0.25/2 | 100 |
| B | LP-2 | 4,000 | 2 | 0.125/2 | 100 |
| C | LP-32 | 4,000 | 0.5 | 0.375/2 | 100 |
| D | LP-32 | 4,000 | 0.5 | 0.25/2 | 100 |
| E | ZL-152 | 4,000 | 0 | 0.375/2 | 100 |
| F | ZL-152 | 4,000 | 0 | 0.25/2 | 100 |
| G | ZL-137 | 1,000 | 6 | 0.375/2 | 100 |
| H | ZL-137 | 1,000 | 6 | 0.375/2 | 120 |
| I | LP-3 | 1,000 | 2 | 0.375/2 | 120 |

The properties of the resulting foams are as follows:

|   | Cell structure | Foam character | Density, lbs./cu. ft. |
|---|---|---|---|
| A | Good | Flexible and resilient | 3.09 |
| B | Fair | do | 2.99 |
| C | Good | Soft and flexible | |
| D | do | do | 5.45 |
| E | do | Flexible and resilient | 5.44 |
| F | Fair | do | 3.71 |
| G | do | do | 1.33 |
| H | Good | do | 1.55 |
| I | Fair | do | 1.65 |

Example 3

Additional foams are prepared by the procedure described in Example 1, using two different types of liquid polysulfide polymer and varying the amount of water used during the foaming step. "Thiokol" LP-2 is a liquid polymer having a molecular weight of 4000 and 2% cross-linking; "Thiokol" LP-32 also has a molecular weight of 4000 but is cross-linked to the extent of only 0.5%. In each of the samples described below, the ratio of sulfhydryl groups to isocyanate groups is 0.25:2. The proportions of ingredients used and the characteristics of the resulting foams are as follows:

|   | "Thiokol" type | Water, percent of theory used | Cell structure | Foam character | Density, lbs./cu. ft. |
|---|---|---|---|---|---|
| A | LP-2 | 120 | Good | Flexible | 6.49 |
| B | LP-2 | 160 | Fair | do | 4.39 |
| C | LP-2 | 200 | Poor | Flexible with quick recovery | 2.82 |
| D | LP-32 | 120 | Good | Soft and resilient | 5.08 |
| E | LP-32 | 140 | Fair | do | 3.45 |
| F | LP-32 | 160 | do | do | 4.13 |
| G | LP-32 | 180 | do | do | 4.35 |
| H | LP-32 | 200 | do | do | 3.78 |

The cellular rubber-like materials of this invention are useful in all applications where sponge rubber has been employed. They may be used in furniture upholstery, mattresses, pillows and other cushioning material, as insulation and as sound deadening material. They are particularly useful in that the foam may be formed in place, to fill up whatever space the liquid mixture of the intermediate polythiourethane product and water can be poured into. They adhere strongly to most materials, so that it is ordinarily necessary to coat the walls of the mold with a mold-release agent such as paraffin wax if the foam is to be removed from the mold.

I claim:

1. A cellular rubber-like material comprising the reaction product of water with a fluid polythiourethane product formed by condensing an arylene diisocyanate and a liquid polysulfide polymer having terminal sulfhydryl groups and having a molecular weight of from about 1000 to about 4000 and having a plurality of interalinear polysulfide linkages connecting recurring units selected from the group consisting of alkylene and oxyalkylene units, said polysulfide polymer being selected from the group consisting of linear polymers and polymers cross-linked to the extent of up to about 6%, said cross-linkages being selected from the group consisting of polysulfide cross-linkages and sulfhydryl groups capable of forming cross-linkages, the proportions of reactants being such that the ratio of sulfhydryl groups present in the polysulfide polymer to isocyanate groups present in the arylene diisocyanate is from 0.1:2 to 0.4:2 and the amount of water used is from about one to about two times the amount which is equivalent to the unreacted isocyanate groups present in the said polythiourethane product.

2. A cellular rubber-like material according to claim 1 in which the arylene diisocyanate is 2,4-tolylene diisocyanate.

3. A fluid water-foamable polythiourethane product comprising the reaction product of an arylene diisocyanate and a liquid polysulfide polymer having terminal sulfhydryl groups and having a molecular weight of from about 1000 to about 4000 and having a plurality of intralinear polysulfide linkages connecting recurring units selected from the group consisting of alkylene and oxyalkylene units, said polysulfide polymer being selected from the group consisting of linear polymers and polymers cross-linked to the extent of up to about 6%, said cross-linkages being selected from the group consisting of polysulfide cross-linkages and sulfhydryl groups capable of forming cross-linkages, the proportions of reactants being such that the ratio of sulfhydryl groups present in the polysulfide polymer to isocyanate groups present in the arylene diisocyanate is from 0.1:2 to 0.4:2.

4. A polythiourethane product according to claim 3 in which the arylene diisocyanate is 2,4-tolylene diisocyanate.

5. A method of preparing a cellular rubber-like material which comprises forming a polythiourethane product by heating together an arylene diisocyanate and a liquid polysulfide polymer having terminal sulfhydryl groups and having a molecular weight of from about 1000 to about 4000 and having a plurality of intralinear polysulfide linkages connecting recurring units selected from the group consisting of alkylene and oxyalkylene units, said polysulfide polymer being selected from the group consisting of linear polymers and polymers cross-linked to the extent of up to about 6%, said cross-linkages being selected from the group consisting of polysulfide cross-linkages and sulfhydryl groups capable of forming cross-linkages, the proportions of the reactants being such that the ratio of sulfhydryl groups present in the polysulfide polymer to isocyanate groups present in the diisocyanate is from 0.1:2 to 0.4:2 and thereafter foaming the said polythiourethane product by mixing it with an amount of water which is from one to two times the amount equivalent to the unreacted isocyanate groups present in the said polythiourethane product.

6. The process of claim 5 in which the foaming step is carried out in the presence of a tertiary amine catalyst.

7. In the preparation of cellular rubber-like materials, the step which comprises forming a fluid water-foamable polythiourethane product by heating together an arylene diisocyanate and a liquid polysulfide polymer having terminal sulfhydryl groups and having a molecular weight of from about 1000 to about 4000 and having a plurality of intralinear polysulfide linkages connecting recurring units selected from the group consisting of alkylene and oxyalkylene units, said polysulfide polymer being selected from the group consisting of linear polymers and polymers cross-linked to the extent of up to about 6%, said cross-linkages being selected from the group consisting of polysulfide cross-linkages and sulfhydryl groups capable of forming cross-linkages, the proportions of the reactants being such that the ratio of sulfhydryl groups present in the polysulfide polymer to isocyanate groups present in the arylene diisocyanate is from 0.1:2 to 0.4:2.

References Cited in the file of this patent

UNITED STATES PATENTS

| 2,284,896 | Hanford | June 2, 1942 |
| 2,400,474 | Ten Broeck | May 14, 1946 |
| 2,466,963 | Patrick et al. | Apr. 12, 1949 |
| 2,602,783 | Simon et al. | July 8, 1952 |

FOREIGN PATENTS

| 574,901 | Great Britain | Jan. 29, 1946 |
| 630,488 | Great Britain | Oct. 14, 1949 |

UNITED STATES PATENT OFFICE
CERTIFICATE OF CORRECTION

Patent No. 2,814,600 November 26, 1957

Andrew Mitchell, 3rd

It is hereby certified that error appears in the printed specification of the above numbered patent requiring correction and that the said Letters Patent should read as corrected below.

Column 4, line 58, for "interalinear" read -- intralinear --.

Signed and sealed this 11th day of February 1958.

(SEAL)
Attest:
KARL H. AXLINE
Attesting Officer

ROBERT C. WATSON
Commissioner of Patents